(12) United States Patent
Kaita et al.

(10) Patent No.: US 8,972,130 B2
(45) Date of Patent: Mar. 3, 2015

(54) CONTROL DEVICE FOR VEHICLE

(75) Inventors: Keiji Kaita, Miyoshi (JP); Masaya Amano, Toyota (JP); Takeshi Hoshiba, Anjo (JP); Koji Hokoi, Toyota (JP); Takahiko Hirasawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/984,927

(22) PCT Filed: Feb. 14, 2011

(86) PCT No.: PCT/JP2011/053008
§ 371 (c)(1),
(2), (4) Date: Aug. 12, 2013

(87) PCT Pub. No.: WO2012/111067
PCT Pub. Date: Aug. 23, 2012

(65) Prior Publication Data
US 2013/0325275 A1     Dec. 5, 2013

(51) Int. Cl.
| | |
|---|---|
| F16H 59/08 | (2006.01) |
| F16H 59/36 | (2006.01) |
| F16H 59/46 | (2006.01) |
| F16H 61/12 | (2010.01) |
| F16H 61/16 | (2006.01) |
| F16H 59/10 | (2006.01) |

(52) U.S. Cl.
CPC .......... *F16H 61/12* (2013.01); *F16H 2061/168* (2013.01); *F16H 59/105* (2013.01); *F16H 2061/1208* (2013.01); *F16H 2061/1232* (2013.01); *F16H 2061/1284* (2013.01)
USPC .................. 701/62; 701/55; 701/58

(58) Field of Classification Search
None
See application file for complete search history.

(56) References Cited

U.S. PATENT DOCUMENTS

| | | | | |
|---|---|---|---|---|
| 4,838,125 A | * | 6/1989 | Hamano et al. | 477/129 |
| 7,001,308 B2 | * | 2/2006 | Henneken et al. | 477/121 |
| 2009/0017983 A1 | * | 1/2009 | Iwase et al. | 477/3 |
| 2009/0171544 A1 | * | 7/2009 | Tanaka et al. | 701/55 |
| 2009/0204282 A1 | * | 8/2009 | Mizutani | 701/29 |
| 2011/0098881 A1 | * | 4/2011 | Tsutsumi et al. | 701/34 |
| 2011/0112736 A1 | * | 5/2011 | Nakade et al. | 701/58 |
| 2011/0137534 A1 | * | 6/2011 | Kim et al. | 701/62 |
| 2012/0022756 A1 | * | 1/2012 | Ueno et al. | 701/58 |
| 2012/0253618 A1 | * | 10/2012 | Takada et al. | 701/55 |

FOREIGN PATENT DOCUMENTS

| | | |
|---|---|---|
| JP | 2000-296728 A | 10/2000 |
| JP | 2001-289067 A | 10/2001 |

(Continued)

*Primary Examiner* — John R Olszewski
*Assistant Examiner* — Navid Ziaeianmehdizadeh
(74) *Attorney, Agent, or Firm* — Kenyon & Kenyon LLP

(57) ABSTRACT

An ECU determines whether or not there is an abnormality (shift pattern abnormality) in a combination of shift signals provided from a shift position sensor. After occurrence of the shift pattern abnormality is determined, ECU determines whether or not a first condition that a shift pattern has changed into a normal pattern of a drive range, a second condition that a brake is ON and a vehicle is in a stop state is satisfied, and a third condition that an accelerator is OFF are satisfied. When occurrence of the shift pattern abnormality is determined, ECU stops generation of driving force of the vehicle and prohibits switching to the drive range. When ECU determines that the above-mentioned first to third conditions are satisfied after occurrence of the shift pattern abnormality is determined, ECU switches the shift range to the drive range indicated by the shift pattern.

3 Claims, 6 Drawing Sheets

(56) References Cited

FOREIGN PATENT DOCUMENTS

| | | |
|---|---|---|
| JP | 2001-294056 A | 10/2001 |
| JP | 2003-065436 A | 3/2003 |
| JP | 2009133406 A | 6/2009 |
| JP | 2009-248912 A | 10/2009 |
| JP | 2010-230122 A | 10/2010 |
| WO | 2010/110098 A1 | 9/2010 |

* cited by examiner

FIG.5

| | SHIFT SIGNAL | | | | | | | |
|---|---|---|---|---|---|---|---|---|
| SHIFT POSITION | | P | R | N | D | B | FD | RV | MJ |
| | P | O | | | | | | | O |
| | R | | O | | | | | O | O |
| | N | | | O | | | | | O |
| | D | | | | O | | O | | O |
| | (B) | | | | | O | O | | O |

NORMAL TIME

FIG.6

| | SHIFT SIGNAL | | | | | | | |
|---|---|---|---|---|---|---|---|---|
| SHIFT POSITION | | P | R | N | D | B | FD | RV | MJ |
| | P | O | | | ● | | | | O |
| | R | | O | | ● | | | O | O |
| | N | | | O | ● | | | | O |
| | D | | | | O | | O | | O |
| | (B) | | | | ● | O | O | | O |

ABNORMAL TIME (D-ON FAILURE)

CONTROL DEVICE FOR VEHICLE

TECHNICAL FIELD

The present invention relates to control over a vehicle when an abnormality occurs in a sensor detecting the position of a shift lever.

BACKGROUND ART

There has been conventionally known a vehicle in which a shift range is switched in accordance with a result of detection by a shift position sensor detecting the position of a shift lever operated by a driver.

In regard to such a vehicle, Japanese Patent Laying-Open No. 2001-289067 (PTD 1) describes that if it can be determined that the shift range is the N (neutral) range based on the result of detection by the shift position sensor, even at the time of occurrence of an abnormality that it cannot be determined that the shift range is the P (parking) range based on the result of detection by the shift position sensor, startup of the vehicle is permitted in the N range.

CITATION LIST

Patent Document

PTD 1: Japanese Patent Laying-Open No. 2001-289067
PTD 2: Japanese Patent Laying-Open No. 2001-294056
PTD 3: Japanese Patent Laying-Open No. 2003-65436
PTD 4: Japanese Patent Laying-Open No. 2000-296728
PTD 5: Japanese Patent Laying-Open No. 2009-248912

SUMMARY OF INVENTION

Technical Problem

In the technique disclosed in PTD 1, however, at the time of occurrence of an abnormality that it cannot be normally determined that the shift range is the N range, startup of the vehicle cannot be permitted and the vehicle cannot run in the failsafe mode even if it can be normally determined that the shift range is the D (drive) range or the R (reverse) range.

The present invention has been made to solve the above problems, and an object of the present invention is to enhance the ability of the vehicle to run in the failsafe mode when an abnormality occurs in the shift position sensor.

Solution to Problem

A control device according to the present invention controls a vehicle in which a shift range is switched in accordance with a shift signal outputted from a sensor detecting shift operation by a driver. The shift range includes a drive range for causing the vehicle to run. The control device includes: an abnormality determination unit that determines whether or not the shift signal is abnormal; and a running control unit that, when it is determined that the shift signal is abnormal, determines whether or not a predetermined condition, which includes a first condition that the shift signal has changed into a state in which the shift signal normally indicates the drive range after it is determined that the shift signal is abnormal, a second condition that a driver is pressing a brake pedal and the vehicle is in a stop state, and a third condition that an amount of operation of an accelerator pedal is equal to or smaller than a threshold value, is satisfied, and when the predetermined condition is satisfied, permits startup of the vehicle in the drive range indicated by the shift signal.

Preferably, when it is determined that the shift signal is abnormal, the running control unit stops driving force of the vehicle until the predetermined condition is satisfied, and when the predetermined condition is satisfied, the running control unit sets the shift range to the drive range indicated by the shift signal and recovers the driving force of the vehicle.

Preferably, there are a plurality of the shift ranges. The sensor is configured to output a plurality of predetermined combinations of shift signals corresponding to the plurality of the shift ranges, respectively. When a combination of the shift signals does not correspond to any of the plurality of predetermined combinations, the abnormality determination unit determines that the shift signal is abnormal.

Advantageous Effects of Invention

According to the present invention, the ability of the vehicle to run in the failsafe mode when an abnormality occurs in the shift position sensor can be enhanced.

BRIEF DESCRIPTION OF DRAWINGS

FIG. 5 shows a correspondence relationship between shift position and combination of shift signals when the shift sensor is normal.
FIG. 6 shows a correspondence relationship between shift position and combination of shift signals when the shift sensor is abnormal.

DESCRIPTION OF EMBODIMENTS

Figure 1:
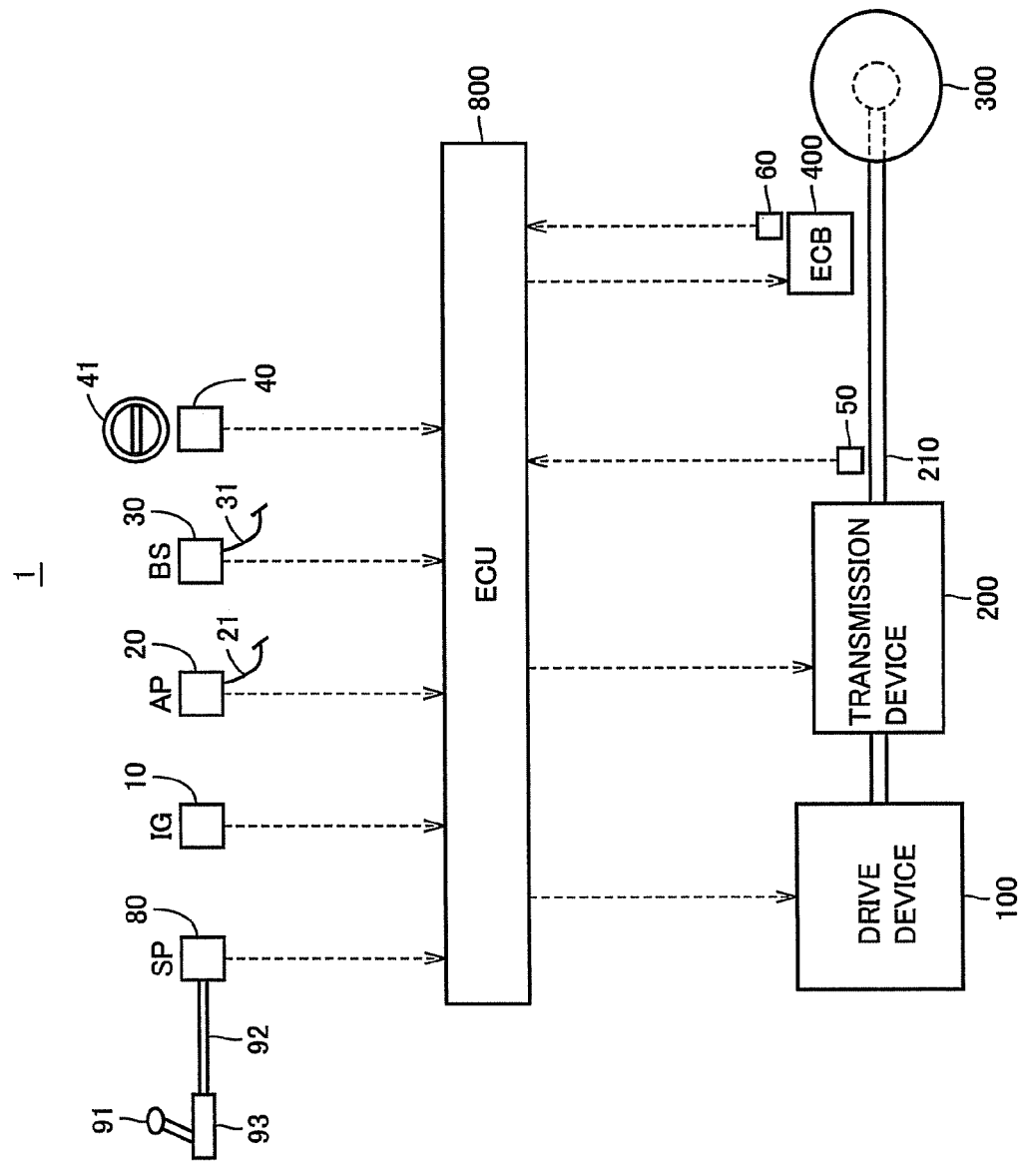
FIG. 1 is an overall block diagram of a vehicle.

Embodiments of the present invention will be described hereinafter with reference to the drawings. In the description below, the same reference characters are given to the same components. Names and functions thereof are also the same. Therefore, detailed description on them will not be repeated.

FIG. 1 is an overall block diagram of a vehicle 1 on which a control device according to the present embodiment is mounted. Vehicle 1 includes a drive device 100, a transmission device 200, a wheel 300, an ECB (Electronically Controlled Brake System) 400, and an ECU (Electronic Control Unit) 800. Vehicle 1 further includes an IG switch 10, an accelerator pedal 21, a brake pedal 31, a steering 41, and a shift lever 91, which are operated by the driver. Vehicle 1 further includes an accelerator position sensor 20, a brake stroke sensor 30, a steering angle sensor 40, a vehicle speed sensor 50, a hydraulic pressure sensor 60, and a shift sensor 80.

Drive device 100, transmission device 200 and ECB 400 are controlled in accordance with control signals provided from ECU 800.

Drive device 100 is a device generating driving force of vehicle 1. Drive device 100 is typically constituted by an engine, a motor and the like.

Transmission device 200 is provided between drive device 100 and wheel 300, for changing the rotation speed of drive device 100 and transmitting the rotation speed to wheel 300. Transmission device 200 includes a plurality of friction engagement elements (clutch and brake) for switching the power transmission direction and the gear ratio, and a parking gear for fixing an output shaft 210 of transmission device 200. In accordance with the control signals provided from ECU 800, the control state of transmission device 200 (hereinafter also referred to as "shift range") is switched to the P (parking) range, the R (reverse) range, the N (neutral) range, the D (drive) range, or the B (brake) range. This scheme of switching the shift range by electric control as described above is also called shift-by-wire scheme. In the D range, the B range and the R range, the driving force of drive device 100 is transmitted to wheel 300 and vehicle 1 runs. In the D range and the B range, vehicle 1 runs in the forward direction. The B range is a shift range in which an engine brake is more effective than in the D range. In the R range, vehicle 1 runs in the backward direction. In the description below, the D range, the B range and the R range are also collectively referred to as "drive range." On the other hand, in the N range, the driving force of drive device 100 is not transmitted to wheel 300. In the P range, the parking gear in transmission device 200 is actuated, output shaft 210 is fixed and rotation of wheel 300 is inhibited. In the description below, the N range and the P range are also collectively referred to as "non-drive range."

ECB (Electronically Controlled Brake System) 400 generates the brake hydraulic pressure in accordance with an amount of stroke of brake pedal 31, thereby causing the brake force to act on wheel 300.

IG switch 10 is a switch used by the driver to input requests for starting up and stopping a drive system of vehicle 1 (electrical equipment required to control running of vehicle 1). Positions to which IG switch 10 is operated include the IG-OFF position for bringing the drive system into the stop state (Ready-OFF state), the IG-ON position for applying electric power to the drive system, the start position for bringing the drive system into the startup state (Ready-ON state), and the like.

Accelerator position sensor 20 detects a position (accelerator position) AP of accelerator pedal 21. Brake stroke sensor 30 detects an amount of operation (brake stroke) BS of brake pedal 31. Steering angle sensor 40 detects a steering angle of steering 41. Vehicle speed sensor 50 detects a vehicle speed V based on the rotation speed of output shaft 210 of transmission device 200. Hydraulic pressure sensor 60 detects a brake hydraulic pressure generated by ECB 400.

Shift sensor 80 is mechanically connected by a push-pull cable 92 to shift lever 91 operated along shift gate 93. Shift sensor 80 outputs, to ECU 800, a shift signal corresponding to a position of shift lever 91 (hereinafter also referred to as "shift position"). The shift signal is used by ECU 800 to determine the shift range requested by the driver (hereinafter also referred to as "requested range"). The shift signal includes a plurality of types of signals corresponding to the shift positions (described below). It is to be noted that shift sensor 80 may be provided near transmission device 200.

ECU 800 has a not-shown CPU (Central Processing Unit) and a not-shown memory built thereinto and executes a predetermined operation based on information stored in the memory and information provided from each sensor. Based on a result of the operation, ECU 800 controls the equipment mounted on vehicle 1.

Figure 2:
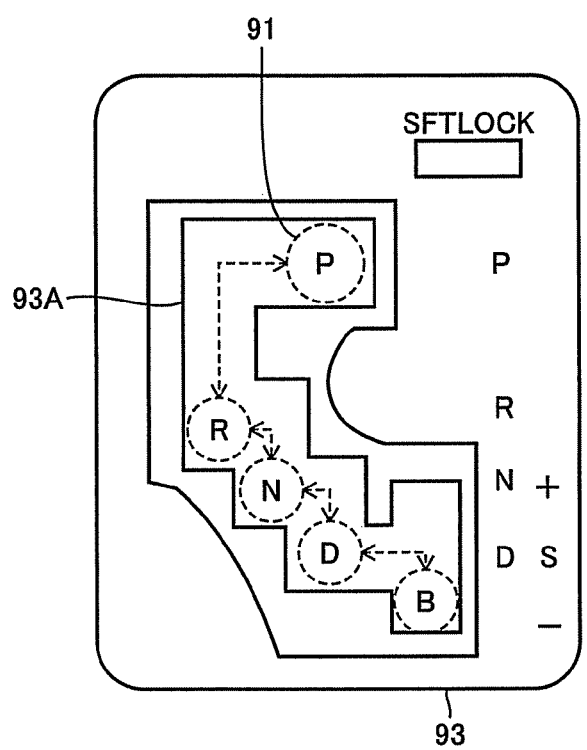
FIG. 2 shows a shift gate.

FIG. 2 shows shift gate 93. As shown in FIG. 2, shift gate 93 has a groove 93A for restricting a movement path of shift lever 91. Shift lever 91 is moved along this groove 93A from the P position side to the P, R, N, D, and B positions in this order.

Figure 3:
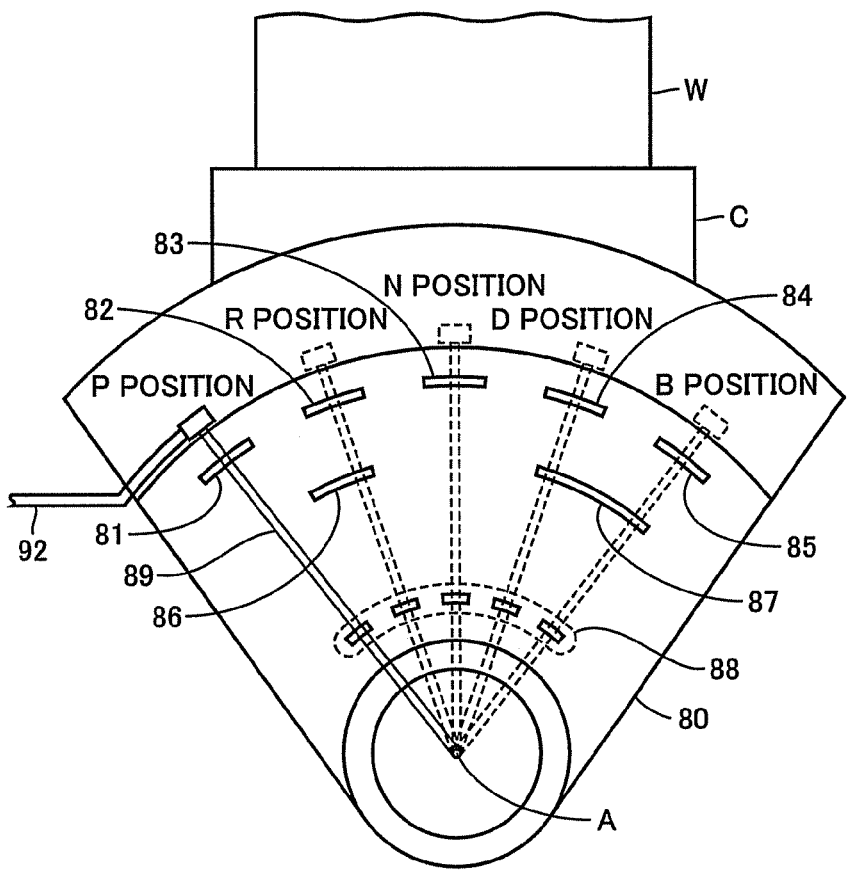
FIG. 3 schematically shows a structure of a shift sensor.

FIG. 3 schematically shows a structure of shift sensor 80. Shift sensor 80 includes first to eighth sensors 81 to 88, a movable lever 89, and a shift connector C. Shift connector C is connected to ECU 800 by a shift wire W.

Movable lever 89 has one end connected to shift lever 91 by push-pull cable 92, and the other end pivotably connected to a pivot shaft A. Push-pull cable 92 is pushed or pulled in accordance with the shift operation by the driver, and thereby movable lever 89 is pivoted around pivot shaft A to a position corresponding to a shift position.

When movable lever 89 is in a range corresponding to the P position, the R position, the N position, the D position, or the B position, first sensor 81, second sensor 82, third sensor 83, fourth sensor 84, or fifth sensor 85 comes into contact with movable lever 89 and outputs a P signal, an R signal, an N signal, a D signal, or a B signal to ECU 800, respectively.

When movable lever 89 is in a range corresponding to the R position, sixth sensor 86 comes into contact with movable lever 89 and outputs an RV signal to ECU 800. When movable lever 89 is in a range corresponding to the D position and the B position, seventh sensor 87 comes into contact with movable lever 89 and outputs an FD (forward) signal to ECU 800. When movable lever 89 is in a range corresponding to the P, R, N, D, and B positions, eighth sensor 88 comes into contact with movable lever 89 and outputs an MJ signal to ECU 800.

Figure 4:
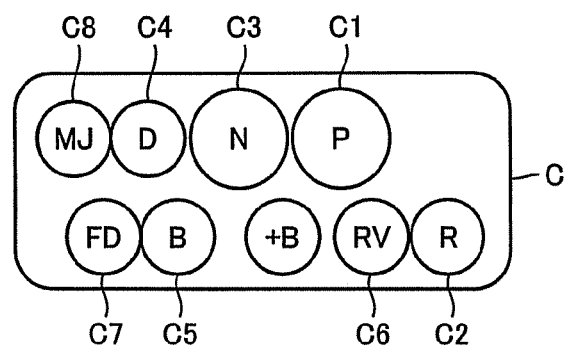
FIG. 4 shows a cross-sectional shape of a shift connector.

FIG. 4 shows a cross-sectional shape of shift connector C. Shift connector C includes connectors C1 to C8 for outputting the P signal, the R signal, the N signal, the D signal, the B signal, the RV signal, the FD signal, and the MJ signal, respectively. The respective signals outputted from these connectors C1 to C8 are inputted to ECU 800 through shift wire W.

FIG. 5 shows a correspondence relationship between shift position and combination of shift signals (hereinafter also referred to as "shift pattern") when shift sensor 80 is normal. In FIG. 5, a circle mark indicates that each of signals from P to MJ is detected. When the P signal and the MJ signal are detected, ECU 800 recognizes the shift pattern as the P pattern (i.e., recognizes the requested range as the P range). When the R signal, the RV signal and the MJ signal are detected, ECU 800 recognizes the shift pattern as the R pattern (i.e., recognizes the requested range as the R range). The same is applied as well to the method for recognizing the N range and the subsequent ranges. In this manner, ECU 800 recognizes the requested range in accordance with the shift pattern. Then, ECU 800 controls transmission device 200 such that the requested range that has been recognized matches the actual shift range.

In vehicle 1 having the above-mentioned configuration, when an abnormality that the shift pattern does not correspond to any of the normal patterns shown in FIG. 5 (hereinafter also referred to as "shift pattern abnormality") occurs while the driver is driving vehicle 1, ECU 800 cannot recognize the requested range.

FIG. 6 shows a correspondence relationship between shift position and shift pattern when shift sensor 80 is abnormal (at the time of occurrence of a D-ON failure in which the D signal is constantly ON). When the D-ON failure occurs, the D signal is detected at all shift positions. Therefore, when the shift position is the D position, the D signal, the FD signal and the MJ signal are detected and the shift pattern matches the D pattern. However, when the shift position is the N position or the P position (position corresponding to the non-drive range), the shift pattern does not correspond to any of the normal patterns shown in FIG. 5. When such a shift pattern abnormality occurs, ECU 800 stops the driving force of vehicle 1 and prohibits switching to the drive range.

In the conventional art, after the shift pattern abnormality occurs, recovery of the driving force is prohibited and switching to the drive range is also prohibited until the shift pattern corresponding to the non-drive range (the P pattern or the N pattern) is normally recognized, even if the shift pattern corresponding to the drive range (the D pattern, the B pattern or the R pattern) is normally recognized. A reason for this is to prevent the vehicle from running against the user's intention. For example, when the shift position is the P position at the time of the D-ON failure, the P signal, the MJ signal and the D signal are detected and occurrence of the shift pattern abnormality is determined. After that, when the shift position is changed into the D position by the driver, the D signal, the FD signal and the MJ signal are detected and the shift pattern changes into a state in which the shift pattern matches the D pattern. Such change of the shift pattern may, however, occur even in the cases other than the case where the shift position is changed from the P position to the D position. For example, when the D-ON failure occurs in the case where the shift position is the P position, and thereafter, a P-OFF failure (failure in which the P signal is constantly OFF) and an FD-ON failure (failure in which the FD signal is constantly ON) further occur, the shift pattern matches the D pattern even if the shift position is maintained in the P position (state in which there is a possibility that the driver is not in the vehicle). In the conventional art, in order to prevent recovery of the driving force in such state where the driver is not in the vehicle, the driving force is not recovered even if the shift pattern of the drive range is normally recognized. Due to this, in the conventional art, once occurrence of the shift pattern abnormality is determined, the driving force cannot be recovered even when running of vehicle 1 in the failsafe mode to a repair shop is desired, which causes inconvenience.

In order to solve the above-mentioned conventional problem, even after occurrence of the shift pattern abnormality is determined, ECU 800 according to the present embodiment definitely determines that the drive range indicated by the shift pattern is the requested range and recovers the driving force, when the shift pattern changes into the normal pattern of the drive range after occurrence of the shift pattern abnormality is determined, when the brake is ON and the vehicle is in the stop state, and when the accelerator is OFF. This is the most characteristic point in the present embodiment.

Figure 7:
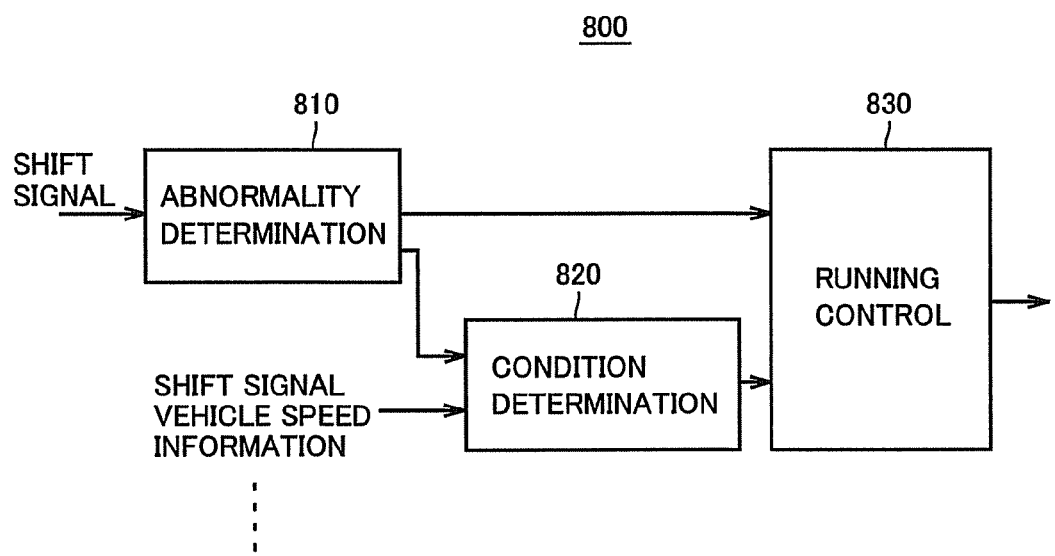
FIG. 7 is a functional block diagram of an ECU.

FIG. 7 is a functional block diagram of ECU 800. Each functional block shown in FIG. 7 may be implemented by hardware, or may be implemented by software.

ECU 800 includes an abnormality determination unit 810, a condition determination unit 820 and a running control unit 830.

Abnormality determination unit 810 determines whether or not the above-mentioned shift pattern abnormality is occurring, based on the shift signal.

After occurrence of the shift pattern abnormality is determined, condition determination unit 820 determines whether or not a first condition that the shift pattern has changed into the normal pattern of the drive range is satisfied, whether or not a second condition that the brake is ON and vehicle 1 is in the stop state is satisfied, and whether or not a third condition that the accelerator is OFF is satisfied. The state in which the brake is ON refers to a state in which the driver is pressing brake pedal 31 (state in which the hydraulic brake force by ECB 400 is acting). A reason for using the state in which the brake is ON as one of the conditions for recovering the driving force is to ensure that sudden movement of vehicle 1 is prevented even if the driving force is recovered when vehicle 1 is in the stop state. In addition, the state in which the accelerator is OFF refers to a state in which an amount of operation of the accelerator pedal is equal to or smaller than a threshold value. A reason for using the state in which the accelerator is OFF as one of the conditions for recovering the driving force is to ensure that abrupt acceleration of vehicle 1 is avoided even if the driving force is recovered.

When occurrence of the shift pattern abnormality is determined, running control unit 830 stops actuation of drive device 100 to stop generation of the driving force, and prohibits switching to the drive range. When condition determination unit 820 determines that the above-mentioned first to third conditions are all satisfied after occurrence of the shift pattern abnormality is determined, running control unit 830 definitely determines that the drive range indicated by the shift pattern is the requested range, switches the shift range to that drive range, and actuates drive device 100 again to recover the driving force. As a result, vehicle 1 can run in the failsafe mode.

Figure 8:
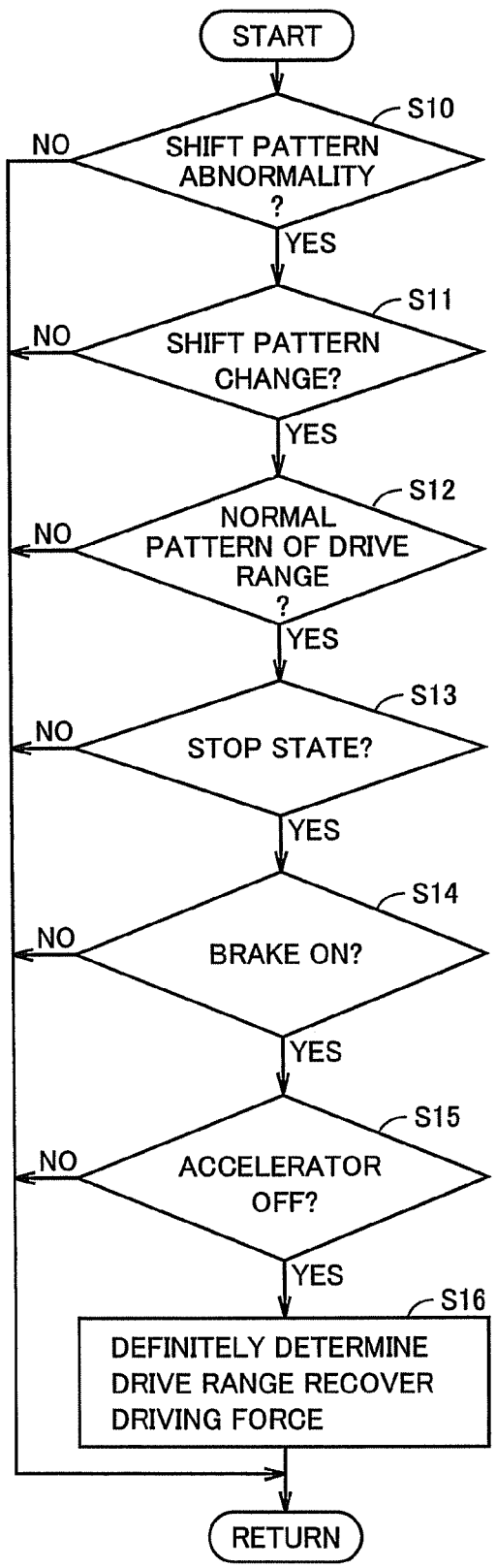
FIG. 8 is a flowchart showing a process procedure by the ECU.

FIG. 8 is a flowchart showing a process procedure by ECU 800 for implementing the above-mentioned functions. The flowchart in FIG. 8 is repeatedly executed at a predetermined cycle during actuation of the drive system of vehicle 1.

In step (hereinafter the step is abbreviated as "S") 10, ECU 800 determines whether or not there is a shift pattern abnormality. If there is no shift pattern abnormality (NO in S10), ECU 800 ends the process and performs normal control. If there is a shift pattern abnormality (YES in S10), ECU 800 stops the driving force as described above and the process proceeds to S11.

In S11, ECU 800 determines whether or not the shift pattern has changed. If the shift pattern has changed (YES in S11), the process proceeds to S12 and ECU 800 determines whether or not the changed shift pattern matches the normal pattern of the drive range.

If the changed shift pattern matches the normal pattern of the drive range (YES in S12), the process proceeds to S13 and ECU 800 determines whether or not vehicle 1 is in the stop state. When an absolute value of vehicle speed V is equal to or lower than a predetermined speed, ECU 800 determines that vehicle 1 is in the stop state.

If vehicle 1 is in the stop state (YES in S13), the process proceeds to S14 and ECU 800 determines whether or not the brake is ON. Determination as to whether or not the brake is ON can be made based on, for example, whether or not the brake hydraulic pressure is equal to or higher than a threshold value, whether or not brake stroke BS is equal to or higher than a threshold value, or the like.

If the brake is ON (YES in S14), the process proceeds to S15 and ECU 800 determines whether or not the accelerator is OFF.

If the accelerator is OFF (YES in S15), the process proceeds to S16 and ECU 800 definitely determines that the drive range indicated by the changed shift pattern is the requested range, switches the shift range to the definitely determined drive range, and recovers the driving force. As a result, vehicle 1 can run in the failsafe mode.

In any of the following cases: if the shift pattern does not change (NO in S11), if the changed shift pattern does not match the normal pattern of the drive range (NO in S12), if vehicle 1 is not in the stop state (NO in S13), if the brake is not ON (NO in S14), and if the accelerator is not OFF (NO in S15), ECU 800 ends the process without recovering the driving force.

As described above, even after occurrence of the shift pattern abnormality is determined, ECU 800 according to the present embodiment permits startup of vehicle 1 by recovering the driving force and switching to the drive range, when the shift pattern has changed into the normal pattern of the drive range, when the brake is ON and vehicle 1 is in the stop state, and when the accelerator is OFF. As a result, even after occurrence of the shift pattern abnormality is determined, the driving force can be recovered in an appropriate state where vehicle 1 is in the stop state and abrupt acceleration of vehicle 1 is avoided, and vehicle 1 can run in the failsafe mode.

In the present embodiment, a description has been given to the case where the drive system itself of vehicle 1 is still maintained at the actuated state after occurrence of the shift pattern abnormality is determined. However, in a vehicle whose drive system is stopped when occurrence of the shift pattern abnormality is determined, for example, the drive system may be started up again when the shift pattern has changed into the normal pattern of the drive range after occurrence of the shift pattern abnormality is determined, when the brake is ON and the vehicle is in the stop state, and when the accelerator is OFF.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

Reference Signs List 1 vehicle; 10 IG switch; 20 accelerator position sensor; 21 accelerator pedal; 30 brake stroke sensor; 31 brake pedal; 40 steering angle sensor; 41 steering; 50 vehicle speed sensor; 60 hydraulic pressure sensor; 80 shift sensor; 81 to 88 first to eighth sensors; 89 movable lever; 91 shift lever; 92 push-pull cable; 93 shift gate; 93A groove; 100 drive device; 200 transmission device; 210 output shaft; 300 wheel; 400 ECB; 800 ECU; 810 abnormality determination unit; 820 condition determination unit; 830 running control unit.

The invention claimed is:

1. A control device for a vehicle in which a shift range is switched in accordance with a shift signal outputted from a sensor detecting shift operation by a driver, said shift range including a D range for causing said vehicle to run in a forward direction, said control device comprising:

an abnormality determination unit that determines whether or not said shift signal is abnormal; and a running control unit that, when it is determined that said shift signal is abnormal, determines whether or not a first condition that said shift signal has changed into a state in which said shift signal normally indicates said D range after it is determined that said shift signal is abnormal, a second condition that a driver is pressing a brake pedal and said vehicle is in a stop state, and a third condition that an amount of operation of an accelerator pedal is equal to or smaller than a threshold value are all satisfied, and when said first to third conditions are all satisfied, permits startup of said vehicle in said D range indicated by said shift signal even in a state where a D-ON failure is occurring, and when at least any one of said first to third conditions is not satisfied, does not permit startup of said vehicle in said D range indicated by said shift signal, wherein said D-ON failure is a failure in which said shift signal can change into the state in which said shift signal normally indicates said D range but cannot change into a state in which said shift signal normally indicates a shift range other than said D range.

2. The control device for a vehicle according to claim 1, wherein when it is determined that said shift signal is abnormal, said running control unit stops driving force of said vehicle until said first to third conditions are all satisfied, and when said first to third conditions are all satisfied, said running control unit sets said shift range to said D range indicated by said shift signal and recovers the driving force of said vehicle even in the state where said D-ON failure is occurring.

3. The control device for a vehicle according to claim 1, wherein there are a plurality of said shift ranges, said sensor is configured to output a plurality of predetermined combinations of shift signals corresponding to the plurality of said shift ranges, respectively, and when a combination of said shift signals does not correspond to any of said plurality of predetermined combinations, said abnormality determination unit determines that said shift signal is abnormal.

* * * * *

UNITED STATES PATENT AND TRADEMARK OFFICE
CERTIFICATE OF CORRECTION

| | | Page 1 of 1 |
|---|---|---|
| PATENT NO. | : 8,972,130 B2 | |
| APPLICATION NO. | : 13/984927 | |
| DATED | : March 3, 2015 | |
| INVENTOR(S) | : K. Kaita | |

It is certified that error appears in the above-identified patent and that said Letters Patent is hereby corrected as shown below:

In the Specification

At column 1, line 2, after the title insert missing paragraph:

--Cross Reference to Related Application

This is a national phase application based on the PCT International Patent Application No. PCT/JP2011/053008 filed on February 14, 2011, the entire contents of which are incorporated herein by reference--.

Signed and Sealed this
Tenth Day of November, 2015

Michelle K. Lee
*Director of the United States Patent and Trademark Office*